Patented Aug. 31, 1954

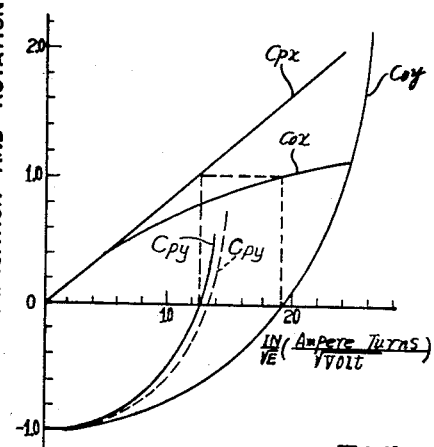
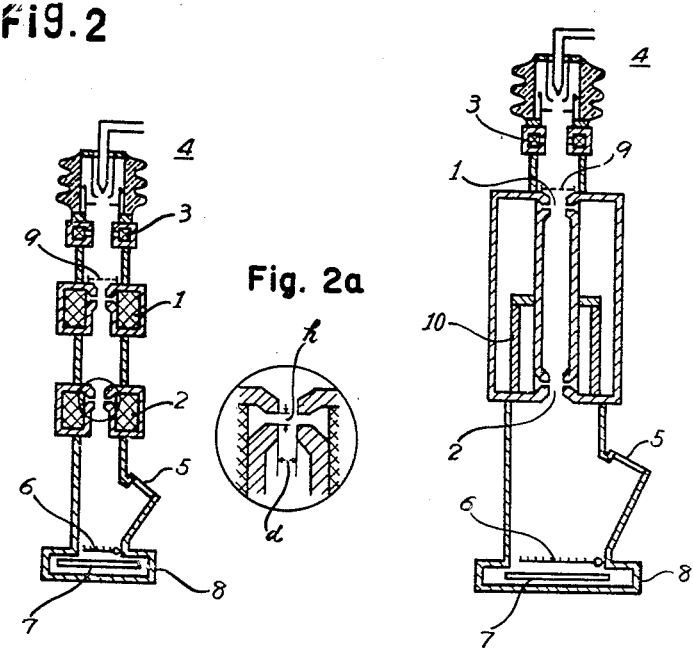

2,688,091

UNITED STATES PATENT OFFICE 2,688,091

ELECTRON LENS SYSTEM

Bunya Tadano and Shinjiro Katagiri, Kita-Tama-Gun, Tokyo, Japan, assignors to Hitachi Limited, Chiyoda-ku, Tokyo, Japan Application May 17, 1952, Serial No. 288,381

Claims priority, application Japan May 21, 1951

2 Claims. (Cl. 250—49.5)

The present invention relates to improvements in electron lens systems, and more particularly to a special selection of each lens of a plurality of lenses for an electron microscope in order substantially to eliminate total chromatic aberration of magnification and rotation.

The object of this invention is to provide an electron lens system which shows practically no chromatic field aberration, compounded of chromatic difference in magnification and chromatic difference in rotation by allowing comparatively free selection of lens characteristics.

In the drawing:

Fig. 1 illustrates characteristic curves of coefficients of chromatic difference in magnification and chromatic difference in rotation;

Fig. 2 is a diagrammatic sectional elevation of an electron microscope having a lens system embodying this invention and Fig. 2a shows an enlarged view of a pole piece, and Fig. 3 is a similar view to Fig. 2 showing another embodiment of this invention.

In general, the coefficients of chromatic difference in magnification and chromatic difference in rotation vary in accordance with the ratio of ampere turns, IN, of the exciting field of each lens and the square root of the accelerating voltage, E, that is, $IN/\sqrt{E}$.

It is a well known fact to those skilled in the art that if the value of $IN/\sqrt{E}$ of an objective and the position of the microscope screen are given, the specimen should be located at a definite position along the optical axis with respect to the given objective.

The inventors have ascertained after careful investigation and experiments that the above coefficients of chromatic difference in magnification and chromatic difference in rotation of an objective and a projector follow the curves $C_{py}$, $C_{oy}$ and $C_{px}$, $C_{ox}$ in Fig. 1 respectively as $IN/\sqrt{E}$ is varied. As apparent from Fig. 1, $C_{px}$ and $C_{ox}$ start from zero and increase along a straight line and a gradually ascending curve respectively so that these are always positive, while $C_{py}$ and $C_{oy}$ start from a negative value and follow a rapidly ascending curve passing through zero and changing sign to become positive as they ascend further.

According to the present invention, the above characteristics as shown in Fig. 1 are utilized in order to eliminate the total chromatic aberration of magnification and rotation of an electron lens system. As an example, a lens system consisting of an objective 1 and a projector 2 is shown in Fig. 2, wherein 3 designates a condenser; 4 an electron source; 5 a viewing window; 6 a fluorescent screen; 7 a photographic plate; 8 the camera box, and 9 represents a specimen support. In such a lens system, to accomplish the above effect, $IN/\sqrt{E}$ of the objective 1 and projector 2 should be so selected as to make the coefficient of chromatic difference in rotation of objective 1, i. e., $C_{ox}$ equal to the coefficient of chromatic difference in rotation of projector 2, i. e., $C_{px}$, and if the direction of image rotation, that is, the excitation of these two lenses be opposite, then the total chromatic aberration of rotation can be eliminated. Also by selecting $IN/\sqrt{E}$ of these two lenses so as to make the coefficient of chromatic aberration of magnification, $C_{oy}$ of the objective 1 equal in value and of opposite sign to the $C_{py}$ of the projector 2, the total chromatic aberration of magnification of these two lenses can be eliminated.

In other words, in order to eliminate both of the chromatic field aberrations, compounded of chromatic difference in magnification and chromatic difference in rotation, the values of $IN/\sqrt{E}$ of objective 1 and projector 2 should be so selected as to make $$C_{px}=C_{ox} \qquad C_{py}=-C_{oy}$$

There exists only one value of $IN/\sqrt{E}$ for satisfying the above condition for each of the lenses 1 and 2. Such a single value of $IN/\sqrt{E}$ must be within an appropriate limit since a higher or a lower value is practically undesirable, but such value for satisfying the above condition would not always fit the required condition.

Now in a magnetic lens, let the pole piece diameter of the lens be $d$, and the pole piece spacing be $h$, then the change of the value $h/d$ has generally no influence on the curves $C_{px}$, $C_{ox}$ and $C_{oy}$ in Fig. 1, while the curve $C_{py}$ representing the coefficient of chromatic difference in magnification of the projector only varies sometimes like the full line curve, or broken line curve in Fig. 1, and the value of $IN/\sqrt{E}$ for making $C_{py}=0$ varies between 12 to 19.

The inventors have taken advantage of the above facts in the electron lens embodying this invention, "$h/d$" of the projector is so selected as to bring the curve of the coefficient of chromatic difference in magnification of the projector, $C_{py}$, to the position of full line curve in Fig. 1, for instance, then at $IN/\sqrt{E}=19$ for the objective and $IN/\sqrt{E}=12.5$ for the projector, the following relations are established:

$$C_{px}=C_{ox}=1.02$$
$$C_{py}=C_{oy}=0$$

so that the condition can be fulfilled to make both of the total chromatic difference in magnification and chromatic difference in rotation substantially equal to zero. In this case, the ratio of the pole piece spacing, $h$, and the pole piece diameter, $d$, that is, $h/d$ is about 5.

If for the objective, $IN/\sqrt{E}=19$, and for projector, $IN/\sqrt{E}=17$; then $$C_{px}=1.4 \quad C_{ox}=1.02$$
$$C_{px}-C_{ox}=0.38$$
$$C_{py}+C_{oy}=0$$

so that the total chromatic aberration of magnification is zero, while the total chromatic aberration of rotation will be 0.38, and in this case, $h/d=0.5$.

If, in the other case, $h/d$ is selected to some other value so as to bring the $C_{py}$ curve on the position shown by the broken line in Fig. 1, the following relations are established when $$IN/\sqrt{E}=18$$

for objective 1 and $IN/\sqrt{E}=13.4$ for projector 2:

$$C_{px}=1.12 \quad C_{ox}=0.98 \quad C_{px}-C_{ox}=0.14$$
$$C_{py}=0.1 \quad C_{oy}=-0.1$$

so that the condition can be fulfilled to eliminate the chromatic field aberration, compounded of chromatic difference in magnification and chromatic difference in rotation practically. In this case, $h/d$ is taken at about 3.

It should be understood that in the electron lens system of this invention the total chromatic aberration of magnification and rotation of the whole lens system is eliminated by taking advantage of the variable characteristics of each coefficient of chromatic aberration of magnification and rotation, and the value of $IN/\sqrt{E}$ of each lens can be selected to a suitable value without being settled to a definite value only so that it provides remarkable advantages for a lens system of this kind.

Though we have described in the foregoing an embodiment of this invention as applied to an electron lens system comprising an objective and a projector, yet in case of a compound electron lens system comprising three or more lenses the total chromatic aberrations can be eliminated in the similar manner by selecting an appropriate value of $h/d$ to make zero the total algebraic sum of the coefficients of chromatic difference in magnification of all lenses and also that of the coefficients of chromatic difference in rotation taking the positive or negative sign due to the direction of image rotation into consideration.

Fig. 3 shows an electron microscope having magnetic lenses, of which the magnet poles are excited in parallel by means of a permanent magnet 10. The same or similar parts to those in Fig. 2 are shown by the same reference numerals and their explanations are omitted. The lens system shown in Fig. 3 may be considered as a kind of compound lens and it will be evident that the above described principle for eliminating the chromatic aberration can be equally applied thereto without further explanation to those skilled in the art.

The lens systems as disclosed herein may be used either alone or in the combinations disclosed in our co-pending application Serial No. 288,382 filed of even date herewith.

What we claim is:

1. In an electron microscope having an electron lens system including a magnetic objective, a magnetic projector and a specimen holder located at the focal plane of the objective, the improvement wherein the magnetic objective has a value $$\frac{IN}{\sqrt{E}}=16 \text{ to } 22$$

and the magnetic projector has a value $$\frac{IN}{\sqrt{E}}=12 \text{ to } 19$$

IN being the equivalent ampere turns of the exciting field of the lens system and E being the accelerating voltage in volts, thereby to eliminate all chromatic field aberration compounded of chromatic differences in magnification and rotation.

2. An electron microscope as in claim 1 wherein the projector includes pole pieces having a ratio of mutual spacing to diameter ranging from 0.5 to 5.

References Cited in the file of this patent

UNITED STATES PATENTS

| Number | Name | Date |
|---|---|---|
| 2,233,264 | Marton | Feb. 25, 1941 |
| 2,270,112 | Borries et al. | Jan. 13, 1942 |
| 2,354,287 | Zworykin et al. | July 25, 1944 |
| 2,485,754 | Le Poole | Oct. 25, 1949 |
| 2,547,994 | Bertein | Apr. 10, 1951 |

OTHER REFERENCES

"A Study of Distortion in Electron Microscope Projection Lens," Hillier Journal of Applied Physics, vol. 17, June 1946, pages 411-419.